June 12, 1962 W. F. ALBRECHT 3,038,696
FAUCET VALVE ASSEMBLY
Filed Jan. 2, 1958
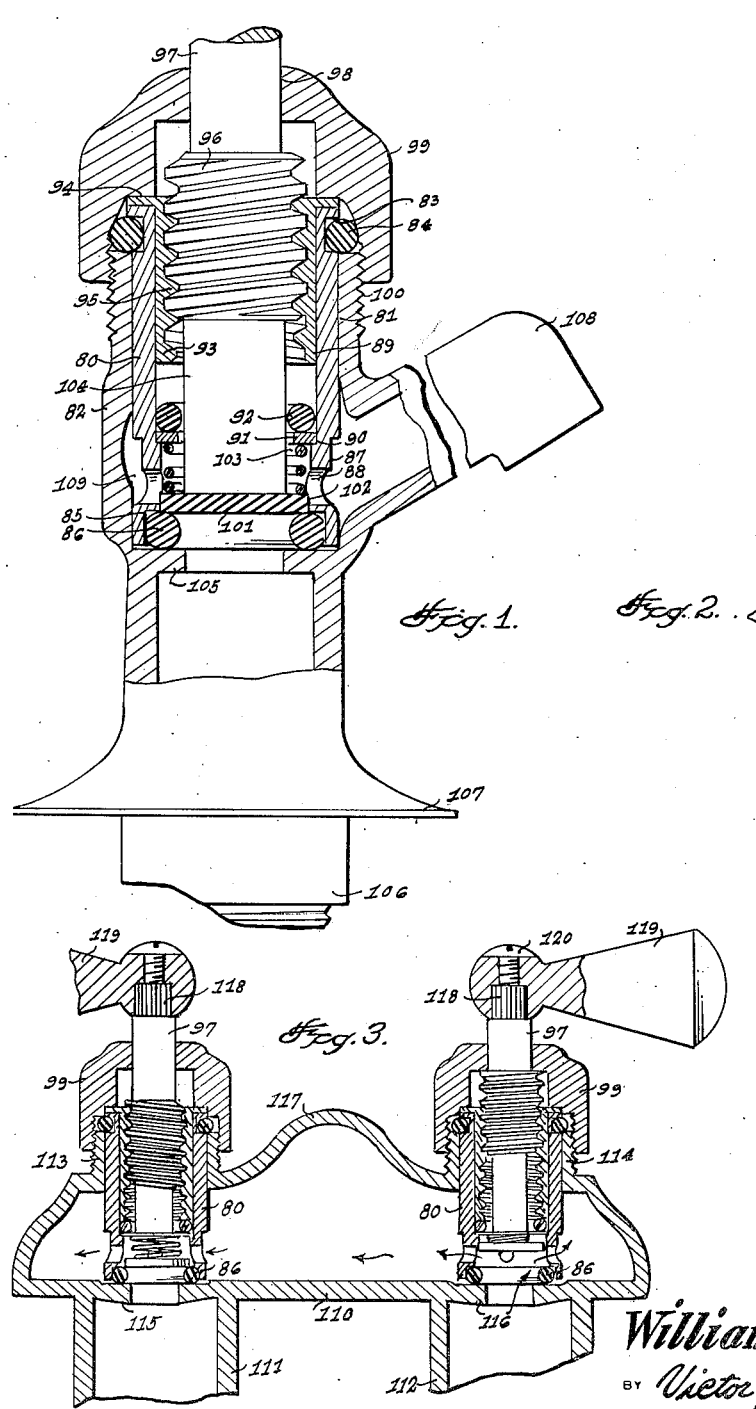
Fig. 1.
Fig. 3.
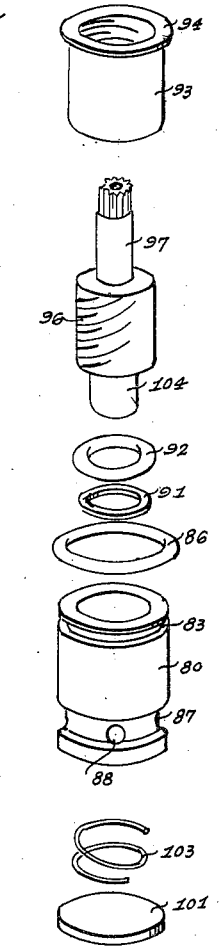
Fig. 2.
INVENTOR.
William F. Albrecht
BY Victor J. Evans &Co.
ATTORNEYS

United States Patent Office 3,038,696
Patented June 12, 1962

3,038,696
FAUCET VALVE ASSEMBLY
William F. Albrecht, 211 E. 4th S.,
Salt Lake City 11, Utah
Filed Jan. 2, 1958, Ser. No. 706,666
1 Claim. (Cl. 251—276)

This invention relates to plumbing fixtures and particularly faucets, and in particular a filling assembly designed to be installed in the valve body of a conventional faucet, and where such body may be considered as worn out, wherein faucets of different makes may be converted into operative fittings and wherein such assemblies extend the life of faucets indefinitely and without repair.

The purpose of this invention is to provide a valve unit or assembly designed to be installed in conventional faucets wherein the valve elements of the assembly are not subjected to the grinding action of conventional faucets and, consequently, last indefinitely.

This application is a continuation in part of my copending application filed February 16, 1954 with the Serial Number 410,643, now patent No. 2,825,529, of March 4, 1958, the operative internal structure being simplified and the knob being replaced with a conventional handle or lever.

In use it has been found advisable to bore the sleeve of the faucet of the co-pending application to provide a shoulder for a packing ring and also to remove the enlarged head or end of the stem and draw the cap at the upper end inwardly to provide a snug fit around the stem. It was also thought advisable to replace the knob with a handle or lever extended from the upper end of the stem.

The object of this invention is, therefore, to provide an improved valve assembly for a conventional faucet wherein the valve assembly is designed to be installed in faucets now in use.

Another object of the invention is to provide an improved assembly for conventional faucets wherein parts of the assembly may be provided in different sizes to accommodate different types of faucets.

A further object of the invention is to provide an improved internal assembly for conventional faucets in which a valve element of the assembly is reversible so that upon wear developing on one side the opposite side may be used.

A still further object of the invention is to provide an internal assembly for conventional faucets in which the assembly is of comparatively simple and inexpensive construction.

With these and other objects and advantages in view the invention embodies a sleeve having an O-ring in an annular groove spaced from the upper end with an internal recess in the lower end positioned to coact with an O-ring in the base of a faucet body, a valve stem threaded in the sleeve and having an O-ring on the intermediate part and positioned to engage a shoulder of the sleeve, a valve disc positioned to be engaged by an enlargement at the lower end of the stem and also positioned to be gripped between the enlargement on the lower end of the stem and O-ring in the lower end of the sleeve, a cap threaded on the upper end of the valve body and having a bore through which the valve stem extends, and a handle removably mounted on the extended end of the stem.

Other features and advantages of the invention will appear from the following description taken in connection with the drawings, wherein:

FIGURE 1 is a vertical section through a faucet, showing wherein a threaded bushing is provided in the sleeve of the faucet.

FIGURE 2 is an exploded view showing a modification wherein the valve assembly is provided with an internally threaded bushing that is mounted in the sleeve designed to be inserted in the faucet body.

FIGURE 3 is a vertical section through a double type of faucet in which two valves are provided with a single outlet spout.

Referring now to the drawings, wherein like reference characters denote corresponding parts the improved faucet valve assembly of this invention includes a sleeve 80, which is positioned in a bore 81 of a valve body 2 and the upper part of the sleeve is provided with an annular recess 83 in which an O-ring 84 is positioned and the inner surface of the lower end of the sleeve is provided with a similar annular recess 85 in which an O-ring 86 is positioned. The lower portion of the sleeve is provided with an annular recess 87 and openings 88, positioned in the recess 87 provide communicating means between the interior and exterior of the sleeve. The sleeve is provided with a bore 89 which extends downwardly from the upper end to a shoulder 90 and the shoulder provides a seat for a ring 91 upon which an O-ring 92 is positioned.

An internally threaded bushing 93 having a flange 94 on the upper end is positioned in the bore 89 of the sleeve 80 and the bushing is positioned whereby threads 95 thereof are in meshing relation with threads 96 of a stem 97. The stem 97 extends through an opening 98 in the upper end of a cap 99 and the cap is threaded on conventional threads 100 of the valve body 82.

In the design shown a valve disc 101 mounted to extend into an annular recess 102 in the bore of the sleeve 80 is positioned to coact with the O-ring 86 to provide a closure member of the valve or faucet. The disc 101 is urged downwardly by the lower end of the valve stem 97, and in the opening movement of the valve upward travel of the disc is limited by a spring 103 that extends around the lower portion 104 of the stem 97 and that is positioned between the ring 91 and the disc 101. In the upward or opening movement of the valve stem the disc 101 is stopped when the O-ring 92 engages the lower end of the bushing 93. The O-ring 92 provides a seal and the spring 103 forms a cushion eliminating an abrupt stop.

The O-ring 86 is positioned to rest upon an inner annular flange 105 of the valve body 82 and the lower end of the valve body is provided with a nipple 106 which extends through an opening in a sink, wash basin, or the like. The lower portion of the valve body is also provided with an arcruate flange 107 that provides a cover for the opening through which the nipple 106 extends. The valve body is also provided with a spout 108 that extends from the valve body and that is in communication with an area 109 extended around the lower portion of the sleeve 80 and which is in communication with the openings 88 in the recess 87.

In FIGURE 3 a double fixture is provided, the fixture having a body 110 with inlet nipples 111 and 112 and with cylindrical portions 113 and 114 which correspond with the upper portion of the valve body 82 of the faucet shown in FIGURE 1 and the O-rings 86 in the lower portion of the sleeves 80 are positioned on horizontally disposed partitions 115 and 116 similar to the flanges 105. In this design a common spout extends from the center portion 117 of the body of the faucet and the upper ends of the stems 97 are provided with splined studs 118 to which handles 119 are secured by screws 120. By this means hot and cold water may be regulated to obtain water through an outlet spout at substantially any temperature desired.

The amount of water passing through the faucets may also be controlled by the thickness of the valve disc 101 or by other suitable means.

It will be understood that modifications, within the scope of the appended claim, may be made in the design and arrangement of the parts without departing from the spirit of the invention.

What is claimed is:

In a faucet valve assembly, the combination which comprises a faucet body having an externally threaded upper end with a bore extended downwardly therethrough and having a supply nipple in communication with the bore and extended from the lower end and a spout also in communication with the valve bore and extended from one side, a sleeve including a cylindrical body and positioned in the bore of the faucet body, the sleeve having internal threads in the upper portion, a shoulder also in the sleeve and positioned below the threads therein, an annular recess in the outer surface and spaced from the upper end, an annular recess in the inner surface and positioned also in the inner surface of the sleeve and in the lower end, and spaced openings through the wall thereof and also spaced from the lower end, an O-ring in the annular recess spaced from the upper end of the sleeve, a ring positioned against the shoulder at the lower end of the threads in the sleeve, an O-ring positioned on said ring, an O-ring in the annular recess in the lower end of the sleeve, the O-ring in the recess of the lower end of the sleeve being positioned upon an inwardly extending annular flange in the valve body, a valve disc positioned on the O-ring in the lower end of the sleeve, a spring engaging said ring and said disc in engagement with said mentioned O-ring, a stem extended through the sleeve and having threads meshing with threads in the sleeve, the lower end of the stem being positioned to engage the valve disc, a cap threaded on the upper end of the faucet body and having a bore meshing around with the valve stem, and a handle removably mounted on the upper end of the valve stem.

References Cited in the file of this patent

UNITED STATES PATENTS

| | | |
|---|---|---|
| 595,877 | Glauber | Dec. 21, 1897 |
| 1,277,413 | Haynes | Sept. 3, 1918 |
| 2,574,851 | Wagner | Nov. 13, 1951 |
| 2,583,291 | Beem | Jan. 22, 1952 |
| 2,616,653 | Tarr | Nov. 4, 1952 |
| 2,658,715 | Kistner | Nov. 10, 1953 |
| 2,658,716 | Winfree | Nov. 10, 1953 |
| 2,676,610 | Hare | Apr. 27, 1954 |
| 2,700,983 | Bryant | Feb. 1, 1955 |
| 2,703,584 | Mix | Mar. 8, 1955 |

FOREIGN PATENTS

| | | |
|---|---|---|
| 380,722 | France | of 1907 |
| 102,415 | Sweden | of 1941 |
| 253,784 | Switzerland | of 1948 |